(12) United States Patent
Kang et al.

(10) Patent No.: US 9,855,821 B2
(45) Date of Patent: Jan. 2, 2018

(54) HEAT PUMP SYSTEM FOR VEHICLE

(71) Applicant: Halla Visteon Climate Control Corp., Daejeon (KR)

(72) Inventors: Sungho Kang, Daejeon (KR); Hakkyu Kim, Daejeon (KR); Sangki Lee, Daejeon (KR); Youngho Choi, Daejeon (KR); Jungjae Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 319 days.

(21) Appl. No.: 14/421,340

(22) PCT Filed: Aug. 16, 2013

(86) PCT No.: PCT/KR2013/007395
§ 371 (c)(1),
(2) Date: Feb. 12, 2015

(87) PCT Pub. No.: WO2014/030884
PCT Pub. Date: Feb. 27, 2014

(65) Prior Publication Data
US 2015/0217627 A1    Aug. 6, 2015

(30) Foreign Application Priority Data

Aug. 20, 2012 (KR) .................. 10-2012-0090592
Aug. 16, 2013 (KR) .................. 10-2013-0097236

(51) Int. Cl.
*F25B 13/00*    (2006.01)
*F25B 27/00*    (2006.01)
(Continued)

(52) U.S. Cl.
CPC ........... *B60H 1/00921* (2013.01); *F25B 5/00* (2013.01); *F25B 6/04* (2013.01); *F25B 41/04* (2013.01);
(Continued)

(58) Field of Classification Search
CPC ...... B60H 1/00921; B60H 2001/00957; F25B 5/00; F25B 6/04; F25B 41/04;
(Continued)

(56) References Cited

U.S. PATENT DOCUMENTS

| 2002/0174670 | A1* | 11/2002 | Kjong-Rasmussen .. F25B 41/04 62/222 |
| 2011/0167849 | A1* | 7/2011 | Kobayashi ......... B60H 1/00914 62/159 |
| 2012/0255319 | A1* | 10/2012 | Itoh ...................... F24F 3/1405 62/160 |

FOREIGN PATENT DOCUMENTS

| JP | 1997-039554 | 2/1997 |
| JP | 2000-062446 A | 2/2000 |

(Continued)

*Primary Examiner* — Joseph Trpisovsky
(74) *Attorney, Agent, or Firm* — Norton Rose Fulbright US LLP; James Crawford

(57) ABSTRACT

A heat pump system for a vehicle having a complex valve device including a three-way valve, an on-off valve, expansion means and connection blocks are formed integrally with one another, the three-way valve part being connected to the refrigerant circulation line of an inlet of the exterior heat exchanger such that the refrigerant selectively bypasses the exterior heat exchanger, the on-off valve part being connected to an inlet of the bypass line to open and close the bypass line. Connection blocks connect the three-way valve part and the on-off valve part with the refrigerant circulation line of an outlet of the exterior heat exchanger to communicate with each other. Expansion means are connected to an inlet of the three-way valve part to selectively expand refrigerant discharged from an interior heat exchanger. All functions of the heat pump system are thus conducted through a refrigerant control of the complex valve device.

15 Claims, 15 Drawing Sheets

(51) Int. Cl.
*F25B 41/00* (2006.01)
*F25B 41/04* (2006.01)
*F25B 1/00* (2006.01)
*B60H 1/00* (2006.01)
*F25B 5/00* (2006.01)
*F25B 6/04* (2006.01)
*F25B 49/02* (2006.01)
*F25B 40/00* (2006.01)
*F25B 41/06* (2006.01)

(52) U.S. Cl.
CPC .... *F25B 49/02* (2013.01); *B60H 2001/00957* (2013.01); *F25B 40/00* (2013.01); *F25B 41/062* (2013.01); *F25B 2341/0662* (2013.01); *F25B 2400/0409* (2013.01); *F25B 2400/0411* (2013.01); *F25B 2500/18* (2013.01); *F25B 2600/2507* (2013.01)

(58) Field of Classification Search
CPC ........ F25B 49/02; F25B 40/00; F25B 41/062; F25B 2400/0409; F25B 2400/0411; F25B 2500/18; F25B 2600/2507; F25B 2341/0662
USPC ......... 62/324.6, 238.7, 196.4, 198, 204, 498
See application file for complete search history.

(56) References Cited

FOREIGN PATENT DOCUMENTS

| | | |
|---|---|---|
| JP | 2006-125768 A | 5/2006 |
| KR | 10-2012-0024273 | 3/2012 |
| KR | 10-2012-0071018 | 7/2012 |

* cited by examiner

PRIOR ART

HEAT PUMP SYSTEM FOR VEHICLE

This application is a §371 of International Application No. PCT/KR2013/007395 filed Aug. 16, 2013, and claims priority from Korean Patent Application Nos. 10-2012-0090592 filed Aug. 20, 2012 and 10-2013-0097236 filed Aug. 16, 2013.

BACKGROUND OF THE INVENTION

Field of the Invention

The present invention relates to a heat pump system for a vehicle, and more particularly, to a heat pump system for a vehicle having a complex valve device which includes: a three-way valve, an on-off valve, expansion means and connection blocks are formed integrally with one another, the three-way valve part being connected to the refrigerant circulation line of an inlet of the exterior heat exchanger such that the refrigerant selectively bypasses the exterior heat exchanger, the on-off valve part being connected to an inlet of the bypass line to open and close the bypass line, the connection blocks connecting the three-way valve part and the on-off valve part with the refrigerant circulation line of an outlet of the exterior heat exchanger to communicate with each other, and expansion means being connected to an inlet of the three-way valve part to selectively expand refrigerant discharged from an interior heat exchanger Background Art In general, an air conditioner for a vehicle includes a cooling system for cooling the interior of the vehicle and a heating system for heating the interior of the vehicle. At an evaporator side of a refrigerant cycle, the cooling system converts air into cold air by heat-exchanging the air passing outside an evaporator with refrigerant flowing inside the evaporator so as to cool the interior of the vehicle. At a heater core side of a cooling water cycle, the heating system converts air into warm air by heat-exchanging the air passing outside the heater core with cooling water flowing inside the heater core so as to heat the interior of the vehicle.

In the meantime, differently from the air conditioner for the vehicle, a heat pump system which can selectively carry out cooling and heating by converting a flow direction of refrigerant using one refrigerant cycle has been applied. For instance, the heat pump system includes two heat exchangers: one being an interior heat exchanger mounted inside an air-conditioning case for heat-exchanging with air blown to the interior of the vehicle; and the other one being an exterior heat exchanger for heat-exchanging outside the air-conditioning case, and a direction-adjustable valve for changing a flow direction of refrigerant. Therefore, according to the flow direction of the refrigerant by the direction-adjustable valve, the interior heat exchanger serves as a heat exchanger for cooling when the cooling mode is operated, and serves as a heat exchanger for heating when the heating mode is operated.

Various kinds of the heat pump system for the vehicle have been proposed, and FIG. 1 illustrates a representative example of the heat pump system for the vehicle.

As shown in FIG. 1, the heat pump system for the vehicle includes: a compressor 30 for compressing and discharging refrigerant; a high pressure heat exchanger 32 for radiating heat of the refrigerant discharged from the compressor 30; a first expansion valve 34 and a first on-off valve 36 mounted in parallel for selectively passing the refrigerant passing through the high pressure heat exchanger 32; an outdoor heat exchanger 48 for heat-exchanging the refrigerant passing through the first expansion valve 34 or the first on-off valve 36 outdoors; a low pressure heat exchanger 60 for evaporating the refrigerant passing through the outdoor heat exchanger 48; an accumulator 62 for dividing the refrigerant passing through the low pressure heat exchanger 60 into a gas-phase refrigerant and a liquid-phase refrigerant; an inside heat exchanger 50 for heat-exchanging refrigerant supplied to the low pressure heat exchanger 60 with refrigerant returning to the compressor 30; a second expansion valve 56 for selectively expanding the refrigerant supplied to the low pressure heat exchanger 60; a bypass line 58a mounted in parallel with the second expansion valve 56 and the low pressure heat exchanger 60 for connecting an outlet of the outdoor heat exchanger 48 with an inlet of the accumulator 62; and a second on-off valve 58 for opening and closing the bypass line 58a.

In FIG. 1, the reference numeral 10 designates an air-conditioning case in which the high pressure heat exchanger 32 and the low pressure heat exchanger 60 are embedded, the reference numeral 12 designates a temperature-adjustable door for controlling a mixed amount of cold air and warm air, and the reference numeral 20 designates a blower mounted at an inlet of the air-conditioning case.

According to the heat pump system having the above structure, when a heat pump mode (heating mode) is operated, the first on-off valve 36 and the second expansion valve 56 are closed, and the first expansion valve 34 and the second on-off valve 58 are opened. Moreover, the temperature-adjustable door 12 is operated as shown in FIG. 1. Accordingly, the refrigerant discharged from the compressor 30 passes through the high pressure heat exchanger 32, the first expansion valve 34, the outdoor heat exchanger 48, a high pressure side 52 of the inside heat exchanger 50, the second on-off valve 58, the accumulator 62, and a low pressure side 54 of the inside heat exchanger 50 in order, and then, is returned to the compressor 30. That is, the high pressure heat exchanger 32 serves as a heater and the outdoor heat exchanger 48 serves as an evaporator.

When an air-conditioning mode (cooling mode) is operated, the first on-off valve 36 and the second expansion valve 56 are opened, and the first expansion valve 34 and the second on-off valve 58 are closed. Furthermore, the temperature-adjustable door 12 closes a passage of the high pressure heat exchanger 32. Therefore, the refrigerant discharged from the compressor 30 passes through the high pressure heat exchanger 32, the first on-off valve 36, the outdoor heat exchanger 48, the high pressure side 52 of the inside heat exchanger 50, the second expansion valve 56, the low pressure heat exchanger 60, the accumulator 62, and the low pressure side 54 of the inside heat exchanger 50 in order, and then, is returned to the compressor 30. That is, the low pressure heat exchanger 60 serves as an evaporator and the high pressure heat exchanger 32 closed by the temperature-adjustable door 12 serves as a heater in the same way as the heat pump mode.

Moreover, besides the bypass line 58a for bypassing the circulating refrigerant, the heat pump system for the vehicle includes a branch line (not shown) for branching a fixed amount of the refrigerant and supplying the refrigerant to a specific part; a three way valve (not shown) mounted on a line, in which the refrigerant flows, for changing a flow direction of the refrigerant; on-off valves 36 and 58 for regulating a flow of the refrigerant; and expansion valves 34 and 56 for expanding the refrigerant.

However, the conventional heat pump system for the vehicle has several disadvantages in that the structure of refrigerant lines (pipes) is complicated because pipes such as the bypass line 58a and the branch line, the three way valve, the on-off valves 36 and 58 and the expansion valves 34 and 56 are closely arranged inside a small engine room, in that the heat pump system needs connection blocks (not shown) for connecting the refrigerant lines (pipes) with each other, and in that the heat pump system occupies a wide space inside the small engine room and is deteriorated in workability and fuel efficiency due to excessive weight because the valves are separately mounted.

SUMMARY OF THE INVENTION

Accordingly, the present invention has been made to solve the above-mentioned problems occurring in the prior arts, and it is an object of the present invention to provide a heat pump system for a vehicle having a complex valve device which includes: a three-way valve, an on-off valve, expansion means and connection blocks are formed integrally with one another, the three-way valve part being connected to the refrigerant circulation line of an inlet of the exterior heat exchanger such that the refrigerant selectively bypasses the exterior heat exchanger, the on-off valve part being connected to an inlet of the bypass line to open and close the bypass line, the connection blocks connecting the three-way valve part and the on-off valve part with the refrigerant circulation line of an outlet of the exterior heat exchanger to communicate with each other, and expansion means being connected to an inlet of the three-way valve part to selectively expand refrigerant discharged from an interior heat exchanger, thereby carrying out all functions (modes) of the heat pump system through a refrigerant control of the complex valve device and reducing the size of the heat pump system due to the simplification of the refrigerant circulation lines (pipes), securing a space of the small engine room and enhancing workability and fuel efficiency by reducing weight because the plural components and functions are integrated by one complex valve device.

To achieve the above objects, the present invention provides a heat pump system for a vehicle in which an interior heat exchanger and an evaporator mounted inside an air-conditioning case and a compressor and an exterior heat exchanger mounted outside the air-conditioning case are connected to a refrigerant circulation line and in which refrigerant circulates the compressor, the interior heat exchanger, the exterior heat exchanger and the evaporator in order, characterized in that the heat pump system comprises: a bypass line which is mounted in a specific zone of the refrigerant circulation line, such that the refrigerant circulating along the refrigerant circulation line selectively bypasses the evaporator; and a first complex valve device including a three-way valve, an on-off valve and connection blocks are formed integrally with one another, the three-way valve part being connected to the refrigerant circulation line of an inlet of the exterior heat exchanger such that the refrigerant selectively bypasses the exterior heat exchanger, the on-off valve part being connected to an inlet of the bypass line to open and close the bypass line, and the connection blocks connecting the three-way valve part and the on-off valve part with the refrigerant circulation line of an outlet of the exterior heat exchanger to communicate with each other.

According to the present invention, the heat pump system for the vehicle having a first complex valve device which includes: a three-way valve, an on-off valve, expansion means and connection blocks are formed integrally with one another, the three-way valve part being connected to the refrigerant circulation line of an inlet of the exterior heat exchanger such that the refrigerant selectively bypasses the exterior heat exchanger, the on-off valve part being connected to an inlet of the bypass line to open and close the bypass line, the connection blocks connecting the three-way valve part and the on-off valve part with the refrigerant circulation line of an outlet of the exterior heat exchanger to communicate with each other, and expansion means being connected to an inlet of the three-way valve part to selectively expand refrigerant discharged from an interior heat exchanger, thereby carrying out all functions (modes) of the heat pump system through the refrigerant control of the first complex valve device and reducing the size of the heat pump system due to the simplification of the refrigerant circulation lines (pipes), securing a space of the small engine room and enhancing workability and fuel efficiency by reducing weight because the plural components and functions are integrated by the first complex valve device.

Moreover, the heat pump system for the vehicle has a second complex valve device which includes: an expansion valve part having an expansion channel formed on the refrigerant circulation line of the inlet of the evaporator for expanding refrigerant supplied to the evaporator; an on-off valve part for regulating a flow of the refrigerant passing through the expansion channel, wherein the expansion valve part and the on-off valve part are formed integrally; a notch part formed on the expansion channel for a flow of the refrigerant, thereby carrying out all functions (modes) of the heat pump system through the refrigerant control of the first complex valve device and the second complex valve device and reducing the size of the heat pump system due to the simplification of the refrigerant circulation lines (pipes), securing a space of the small engine room and enhancing workability and fuel efficiency by reducing weight because the plural components and functions are integrated by the first and second complex valve devices.

Furthermore, the two on-off valves mounted instead of the three way valves which were mounted at branch points of the bypass line serves as the three way valves and one of the on-off valves is integrated with the expansion valve to form the second complex valve device, thereby reducing weight and the number of components of the heat pump system and simplifying the structure of the pipes.

Additionally, because an orifice of the first complex valve device is directly formed on a shaft-type valve member, the heat pump system is simple in manufacturing and prevents a sudden change of the flow channel so as to prevent drop of pressure.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
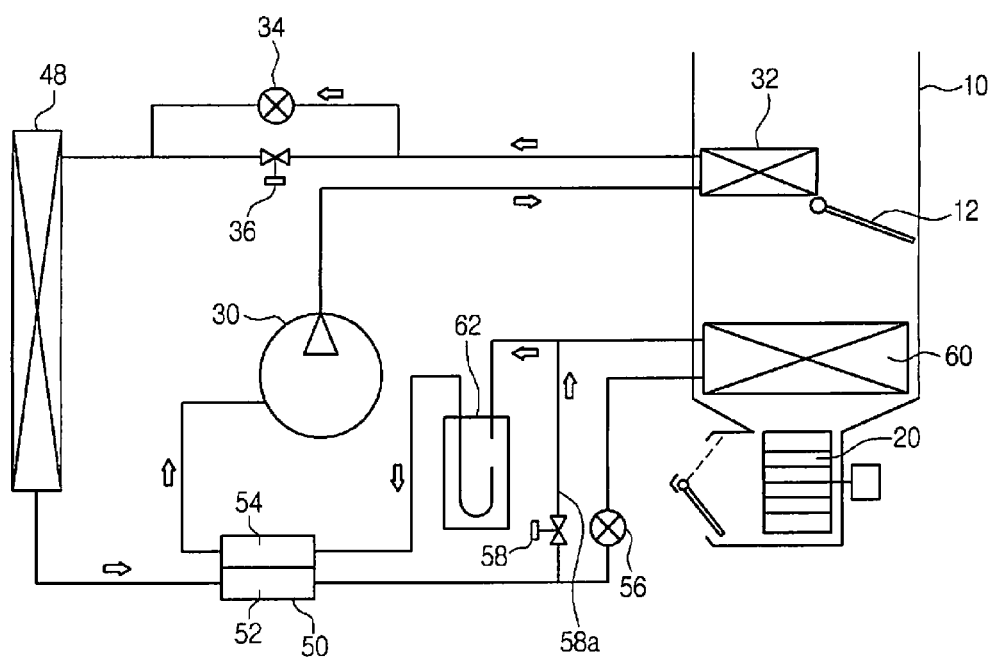
FIG. 1 is a configurative diagram of a conventional heat pump system for a vehicle.

Reference will be now made in detail to the preferred embodiment of the present invention with reference to the attached drawings.

A heat pump system for a vehicle according to a preferred embodiment of the present invention in which a compressor 100, an interior heat exchanger 110, a first complex valve device 200, an exterior heat exchanger 130, a second complex valve device 300 and an evaporator 160 are connected and mounted on a refrigerant circulation line (R) and in which refrigerant is circulated in order is applied to electric vehicles or hybrid vehicles.

Moreover, a bypass line R1 is mounted in a specific zone of the refrigerant circulation line (R) such that the refrigerant flowing along the refrigerant circulation line (R) bypasses the second complex valve device 300 and the evaporator 160.

In this instance, the bypass line R1 is mounted in parallel with the refrigerant circulation line (R).

Furthermore, the heat pump system includes two expansion means: one expansion means 240 being mounted on the refrigerant circulation line which connects the interior heat exchanger 110 and the exterior heat exchanger 130; and the other being an expansion valve part 310 mounted on the refrigerant circulation line (R) of an inlet side of the evaporator 160. In this instance, the expansion means 240 mounted between the interior heat exchanger 110 and the exterior heat exchanger 130 is integrated to the first complex valve device 200, and the expansion valve part 310 mounted on the refrigerant circulation line (R) of the inlet side of the evaporator 160 is integrated to the second complex valve device 300.

Figure 2:
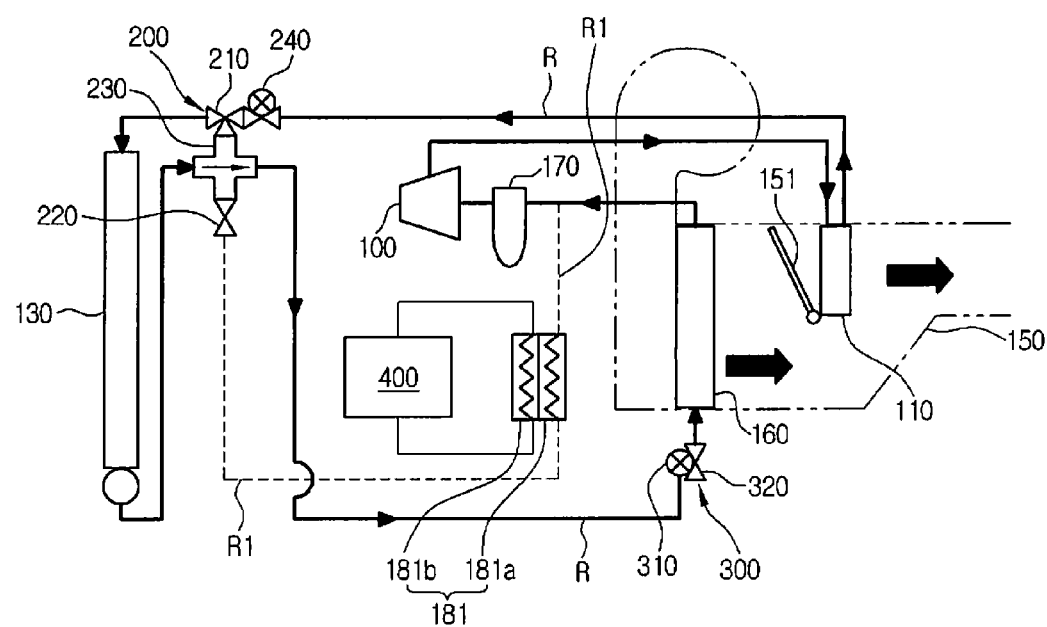
FIG. 2 is a configurative diagram of an air-conditioning mode of a heat pump system for a vehicle according to a preferred embodiment of the present invention.
Figure 3:
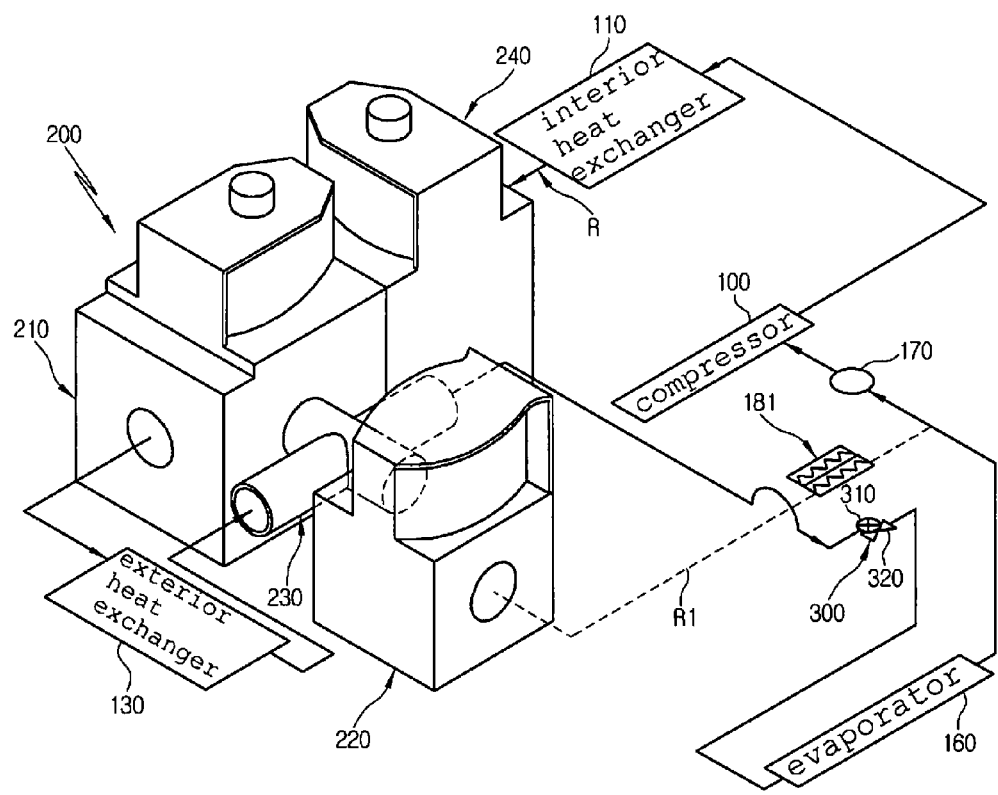
FIG. 3 is a perspective view of a first complex valve device of FIG. 2.

Therefore, in an air-conditioning mode, as shown in FIG. 2, the refrigerant discharged from the compressor 100 circulates the interior heat exchanger 110, the exterior heat exchanger 130, the first complex valve device 300, the second complex valve device 300, the evaporator 160 and the compressor 100 in order, and in this instance, the interior heat exchanger 110 serves as a condenser (heater).

In the meantime, the exterior heat exchanger 130 serves as a condenser like the interior heat exchanger 110.

Figure 6:
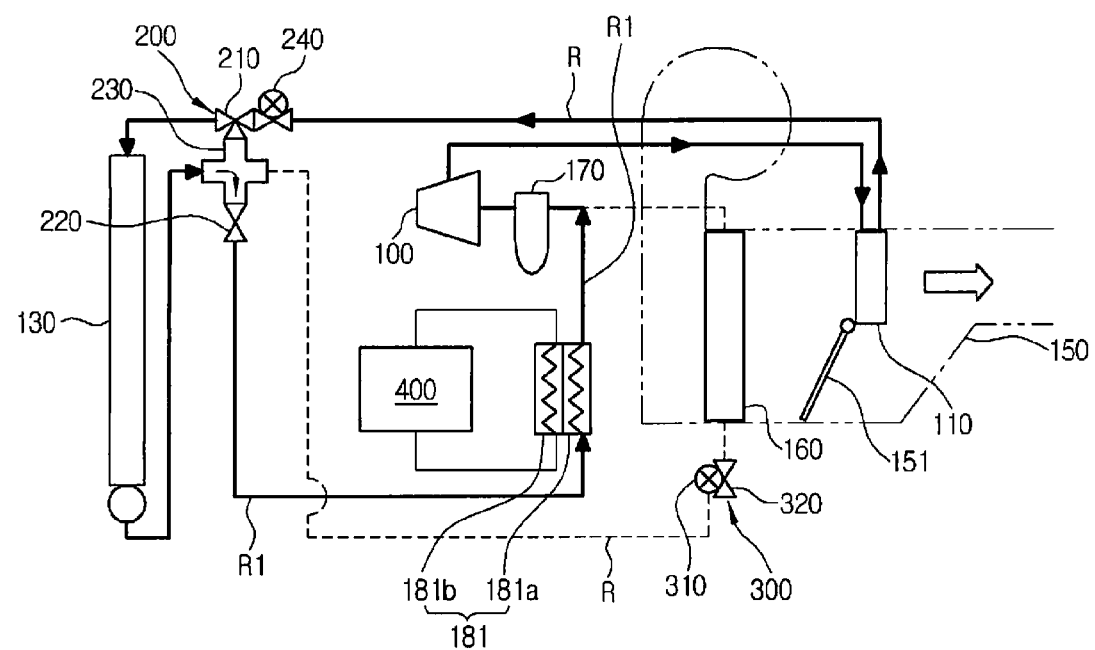
FIG. 6 is a configurative diagram of the maximum heating mode of heat pump modes in the heat pump system according to the preferred embodiment of the present invention.

Furthermore, in a heat pump mode (the maximum heating mode), as shown in FIG. 6, the refrigerant discharged from the compressor 100 circulates the interior heat exchanger 110, the first complex valve device 200, the exterior heat exchanger 130, the bypass line R1 and the compressor 100 in order, and in this instance, the interior heat exchanger 110 serves as a condenser (heater) and the exterior heat exchanger 130 serves as an evaporator, and refrigerant is not supplied to the evaporator 160.

As described above, in the air-conditioning mode and the heat pump mode, the refrigerant circulation directions are the same and lots of the refrigerant circulation lines (R) are used in common, and hence, the heat pump system can prevent stagnation of the refrigerant and simplify the entire refrigerant circulation line (R).

Additionally, in the present invention, the heat pump mode has various modes, such as the maximum heating mode, a dehumidification mode and a defrost mode. The dehumidification mode is carried out in a case that the inside of the vehicle needs dehumidification and the defrost mode is carried out when frosting is generated on the exterior heat exchanger.

Hereinafter, components of the heat pump system according to the preferred embodiment of the present invention will be described in detail.

The compressor 100 mounted on the refrigerant circulation line (R) sucks and compresses refrigerant while operating by receiving a driving force from an engine (an internal combustion engine or a motor), and then, discharges the refrigerant in a gas phase of high temperature and high pressure.

The compressor 100 sucks and compresses the refrigerant discharged from the evaporator 160 and supplies the compressed refrigerant to the interior heat exchanger 110 in the air-conditioning mode, and sucks and compresses the refrigerant passing the bypass line R1 and supplies the compressed refrigerant to the interior heat exchanger 110 in the heat pump mode.

The interior heat exchanger 110 is mounted inside the air-conditioning case 150 and connected with the refrigerant circulation line (R) of an outlet side of the compressor 100, and then, exchanges heat between air flowing inside the air-conditioning case 150 and the refrigerant discharged from the compressor 100.

Moreover, the evaporator 160 is mounted inside the air-conditioning case 150 and connected with the refrigerant circulation line (R) of the inlet side of the compressor 100, and exchanges heat between the air flowing inside the air-conditioning case 150 and the refrigerant supplied to the compressor 100.

The interior heat exchanger 110 serves as a condenser (heater) not only in the air-conditioning mode but also in the heat pump mode.

The evaporator 160 serves as an evaporator in the air-conditioning mode but is stopped in the heating mode of the heat pump modes because refrigerant is not supplied.

Furthermore, the interior heat exchanger 110 and the evaporator 160 are spaced apart from each other at a predetermined interval inside the air-conditioning case 150, and the evaporator 160 and the interior heat exchanger 110 are mounted from the upstream side of the air flow direction inside the air-conditioning case in order.

Therefore, in the air-conditioning mode that the evaporator 160 serves as an evaporator, as shown in FIG. 2, refrigerant of low-temperature and low-pressure expanded through the expansion valve part 310 of the second complex valve device 300 is supplied to the evaporator 160, and in this instance, air flowing inside the air-conditioning case 150 through a blower (not shown) exchanges heat with the refrigerant of low-temperature and low-pressure inside the evaporator 160 while passing the evaporator 160 so as to be changed into cold air, and then, is discharged to the inside of the vehicle to cool the inside of the vehicle.

In the heat pump mode (Maximum heating mode) that the interior heat exchanger 110 serves as a condenser (heater), as shown in FIG. 6, the refrigerant of high-temperature and high-pressure discharged from the compressor 100 is supplied to the interior heat exchanger 110, and in this instance, the air flowing inside the air-conditioning case 150 through the blower (not shown) exchanges heat with the refrigerant of high-temperature and high-pressure inside the interior heat exchanger 110 while passing the interior heat exchanger 110 so as to be changed into warm air, and then, is discharged to the inside of the vehicle to heat the inside of the vehicle.

In the meantime, it is preferable that the size of the evaporator 160 be larger than the interior heat exchanger 110.

In addition, an electric heater (not shown) for enhancing a heating efficiency may be further mounted at the downstream side of the interior heat exchanger 110 inside the air-conditioning case 150.

Additionally, a temperature-adjustable door 151 which adjusts an amount of air bypassing the interior heat exchanger 110 and an amount of air passing the interior heat exchanger 110 is mounted between the evaporator 160 and the interior heat exchanger 110 inside the air-conditioning case 150.

The temperature-adjustable door 151 adjusts the amount of the air bypassing the interior heat exchanger 110 and the amount of the air passing the interior heat exchanger 110 to properly control temperature of air discharged from the air-conditioning case 150.

In this instance, in the air-conditioning mode, as shown in FIG. 2, when a front passage of the interior heat exchanger 110 is completely closed through the temperature-adjustable door 151, because the cold air passing the evaporator 160 bypasses the interior heat exchanger 110 and is supplied to the inside of the vehicle, the maximum cooling is carried out. However, in the heat pump mode (the maximum heating mode), as shown in FIG. 6, when the passage bypassing the interior heat exchanger 110 is completely closed through the temperature-adjustable door 151, because all airs are changed into warm air while passing the interior heat exchanger 110 and is supplied to the inside of the vehicle, the maximum heating is carried out.

Meanwhile, when position of the temperature-adjustable door 151 is regulated, temperature of the air discharged to the inside of the vehicle can be properly regulated. For instance, in the air-conditioning mode, when the temperature-adjustable door 151 is operated to open the passage bypassing the interior heat exchanger 110 and the passage passing through the interior heat exchanger 110, some of the cold air passing the evaporator 160 bypasses the interior heat exchanger 110 and some of the cold air is changed into warm air while passing the interior heat exchanger 110. After that, the cold air and the warm air are mixed together to control the inside of the vehicle to proper temperature, and then, the mixed air passes the evaporator 160 to carry out dehumidification.

Moreover, not only in the air-conditioning mode but also in a mode that some of the refrigerant is supplied to the evaporator 160 out of the heat pump modes, the inside of the vehicle is dehumidified while the air passes the evaporator 160.

As described above, not only in the air-conditioning mode but also the heat pump mode, the heat pump system according to the preferred embodiment of the present invention can perform a dehumidification function inside the vehicle.

Furthermore, the exterior heat exchanger 130 is mounted outside the air-conditioning case 150 and connected with the refrigerant circulation line (R) to exchange heat between the refrigerant circulating in the refrigerant circulation line (R) and the outdoor air.

Here, the exterior heat exchanger 130 is mounted at the front side of the engine room of the vehicle to exchange heat between the refrigerant flowing inside the exterior heat exchanger 130 and the outdoor air.

In the air-conditioning mode, the exterior heat exchanger 130 serves as a condenser like the interior heat exchanger 110, and in this instance, the refrigerant of high-temperature and high-pressure flowing inside the exterior heat exchanger 130 exchanges heat with the outdoor air to be condensed.

Additionally, in the heat pump mode (maximum heating mode), the exterior heat exchanger 130 serves as an evaporator which runs counter to the interior heat exchanger 110, and in this instance, the refrigerant of low temperature flowing inside the exterior heat exchanger 130 exchanges heat with the outdoor air to be evaporated.

In addition, in the present invention, the first complex valve device 200 and the second complex valve device 300 can serve functions of a plurality of valves which are mounted on the refrigerant circulation line to control the refrigerant and a plurality of connection blocks for connecting pipes.

That is, all functions (modes) of the heat pump system can be carried out through refrigerant control of the first and second complex valve devices 200 and 300, reduce the size of the heat pump system due to the simplification of the refrigerant circulation lines (pipes), secure a space of the small engine room and enhance workability and fuel efficiency by reducing weight because the plural components and functions are integrated by each of the complex valve devices.

The first complex valve device 200 includes: a three-way valve part 210 connected to the refrigerant circulation line (R) of the inlet of the exterior heat exchanger 130 to make refrigerant selectively bypass the exterior heat exchanger 130; an on-off valve part 220 connected to the inlet of the bypass line R1 to open and close the bypass line R1; connection blocks 230 for connecting the three-way valve part 210 and the on-off valve part 220 with the refrigerant circulation line (R) of the outlet of the exterior heat exchanger 130 to communicate with each other.

Moreover, the first complex valve device 200 further includes expansion means 240 which is integrally mounted as well as the three-way vale part 210, the on-off valve part 220 and the connection blocks 230. That is, the expansion means 240 is connected to an inlet of the three-way valve part 210 to selectively expand the refrigerant discharged from the interior heat exchanger 110.

In other words, the first complex valve device 200 is a single component in which the three-way valve part 210, the on-off valve part 220, the connection blocks 230 and the expansion means 240 are integrated.

The expansion means 240 includes: an on-off valve 241 which is mounted to connect the refrigerant circulation lines (R) of an inlet 211 of the three-way valve part 210 and the outlet of the interior heat exchanger 110 to regulate a flow of refrigerant; and an orifice 246 disposed integrally with the on-off valve 241 to expand the refrigerant, thereby making the refrigerant flow in an unexpanded state when the on-off valve 241 is opened but making the refrigerant flow in an expanded state through the orifice 246 when the on-off valve 241 is closed.

Figure 4:
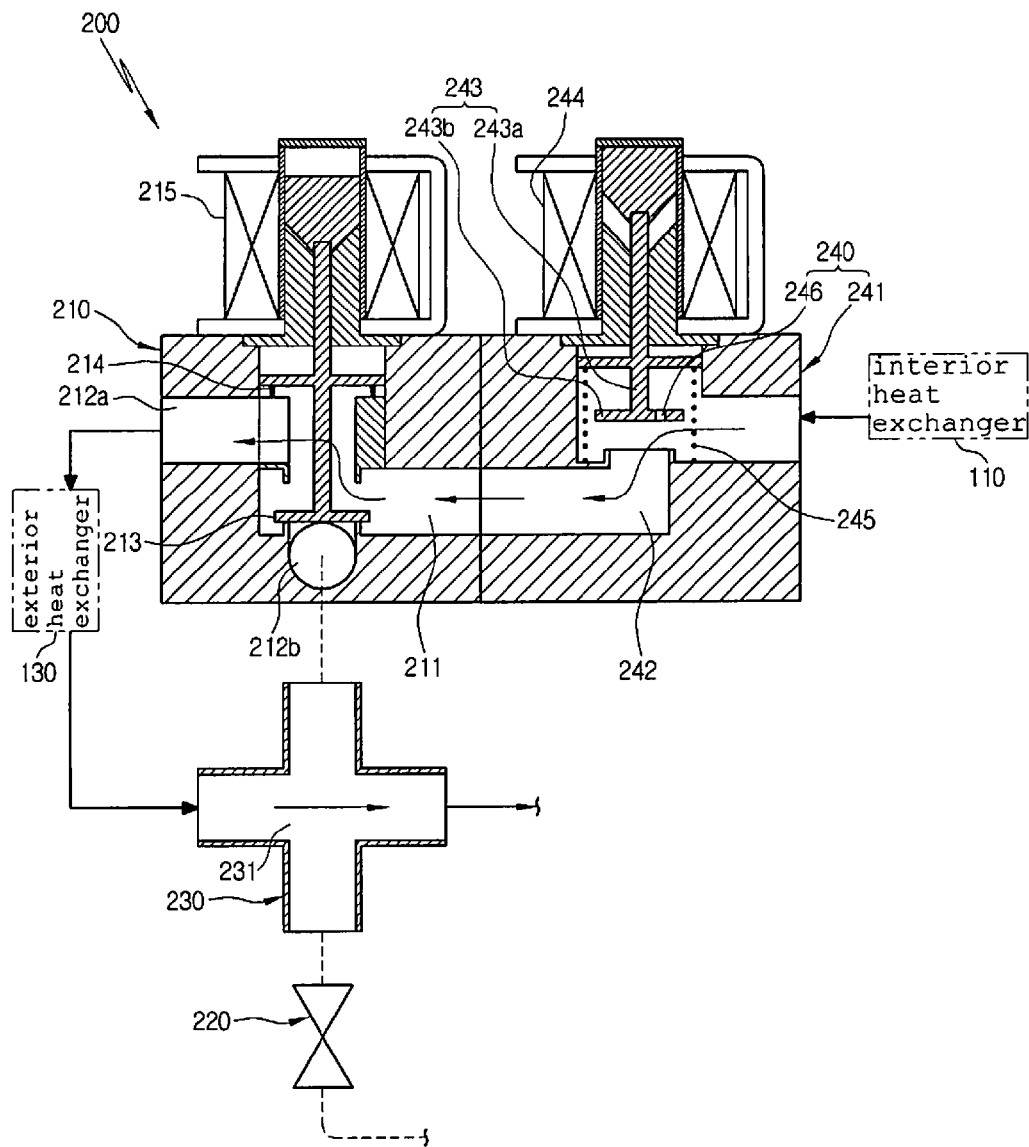
FIG. 4 is a sectional view showing operational states of a three way valve part and expansion means of FIG. 3.

As shown in FIG. 4, the on-off valve 241 includes a flow channel 242 which is formed inside the on-off valve 241 to make the refrigerant flow therein and a valve member 243 mounted to open and close the flow channel 242.

In this instance, the orifice 246 is formed on the valve member 243 of the on-off valve 241.

Here, the valve member 243 includes: a shaft 243a connected with an operating device mounted at one side of the on-off valve 241; and a valve plate 243b formed on the shaft 243a to open and close the flow channel 242, and the orifice 246 penetrates the valve plate 243b of the valve member 243.

Therefore, the refrigerant induced to the flow channel 242 of the on-off valve 241 is expanded while passing the orifice 246 formed on the valve plate 243b.

Figure 14:
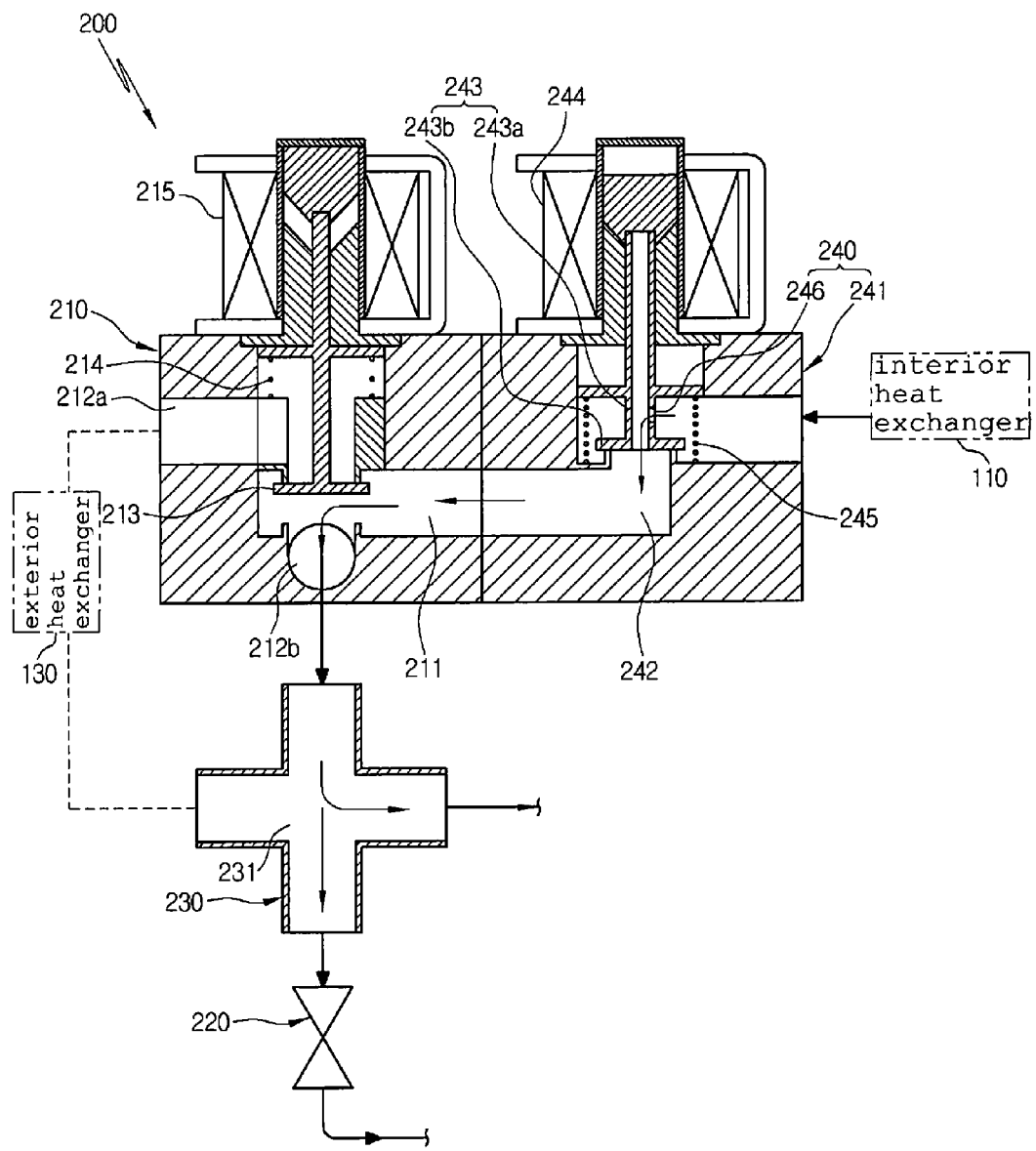
FIG. 14 is a sectional view showing an orifice of a first complex valve device of a heat pump system for a vehicle according to another preferred embodiment of the present invention.

In the meantime, FIG. 14 illustrates an orifice 246 according to another preferred embodiment of the present invention. The valve member 243 illustrated in FIG. 14 includes: a hollow shaft 243a connected with the operating device mounted at one side of the on-off valve 241; and a valve plate 243b formed on the shaft 243a to open and close the flow channel 242, and the orifice 246 is formed to penetrate the inside and outside of the hollow shaft 243a of the valve member 243.

Therefore, the refrigerant induced to the flow channel 242 of the on-off valve 241 is expanded while passing the inside of the shaft 243a after being induced into the orifice 246 formed on the hollow shaft 243a.

As described above, the heat pump system according to the preferred embodiment of the present invention is simple in manufacturing and prevents a sudden change of the flow channel so as to prevent drop of pressure because the orifice 246 is directly formed on the shaft-type valve member 243.

If the orifice 246 is formed on a body of the on-off valve 241, it is difficult to manufacture the heat pump system.

Moreover, a solenoid 244 which is an operating device for opening and closing the valve member 243 is mounted at one side of the on-off valve 241, and an elastic member 245 is mounted inside the on-off valve 241 to open the flow channel 242 by moving the valve member 243 when electricity of the solenoid 244 is cut off.

As described above, when the valve member 243 of the expansion means 240 opens the flow channel 242, the refrigerant passing the expansion means 240 passes in an unexpanded state, but when the valve member 243 of the expansion means 240 closes the flow channel 242, the refrigerant passing the expansion means 240 is expanded while passing the orifice 246 of the valve member 243, and then, passes.

Furthermore, the three-way valve part 210 has one inlet 211 and two outlets 212a and 212b, wherein the one inlet 211 is connected with the flow channel 242 of the on-off valve 241 and the two outlets 212a and 212b are branched from the inlet 211, such that the outlet 212a is connected with the refrigerant circulation line (R) of the inlet of the exterior heat exchanger 130 and the outlet 212b is connected with the connection blocks 230.

Additionally, a valve member 213 which selectively opens the two outlets 212a and 212b is mounted inside the three-way valve part 210.

In addition, a solenoid 215 is mounted at one side of the three-way valve part 210 to operate the valve member 213, and an elastic member 214 is mounted inside the three-way valve part 210 to close the outlet 212a at the side of the exterior heat exchanger 130 by moving the valve member 213 when electricity of the solenoid 215 is cut off.

Therefore, the refrigerant passing the flow channel 242 of the expansion means 240 flows toward the exterior heat exchanger 130 or toward the connection blocks 230, and then, bypasses the exterior heat exchanger 130.

Moreover, the connection block 230 includes a cross-formed four-way flow channel 231 formed inside the connection block 230 to connect the three-way valve part 210, the on-off valve part 220 and the refrigerant circulation line (R) of the outlet of the exterior heat exchanger 130 to be communicated one another.

Therefore, the refrigerant discharged from the exterior heat exchanger 130 can flow toward the second complex valve device 300 and the evaporator 160 through the connection block 230 or flow toward the bypass line R1.

Furthermore, the refrigerant which bypasses the exterior heat exchanger 130 from the three-way valve part 210 and is directly induced to the connection block 230 can flow toward the second complex valve device 300 and the evaporator 160 through the connection block 230 or flow toward the bypass line R1.

In this instance, if the refrigerant bypasses the exterior heat exchanger 130 through the three-way valve part 210, defrost is generated on the exterior heat exchanger 130.

Additionally, even though the refrigerant bypasses the exterior heat exchanger 130, the heat pump system can enhance heating performance by recovering a heat source through a water cooling type heat exchanger 181 or the evaporator 160.

In the meantime, the flow of the refrigerant induced to the connection block 230 is determined through control of the second complex valve device 300 or the on-off valve part 220 mounted on the bypass line R1. That is, through control of the second complex valve device 300 and the on-off valve part 220, refrigerant may flow only toward one side or toward both sides.

In addition, the on-off valve part 220 is mounted at an inlet of the bypass line R1 to connect the connection block 230 and the bypass line R1 with each other in order to selectively turn on and off the bypass line R1.

The structure of the on-off valve part 220 is equal to the structure of the on-off valve 241 of the expansion means 240 from which the orifice 246 is omitted.

In the air-conditioning mode, in the first complex valve device 200, the on-off valve 241 of the expansion means 240 opens the flow channel 242 and the three-way valve part 210 opens the outlet 212a at the side of the exterior heat exchanger 130, and the on-off valve part 220 closes the bypass line R1. After that, when the second complex valve device 300 is opened, the refrigerant passing the on-off valve 241 of the expansion means 240 in the unexpanded state flows toward the exterior heat exchanger 130 through the three-way valve part 210, and the refrigerant passing the exterior heat exchanger 130 flows toward the second complex valve device 300 and the evaporator 160 through the connection block 230.

Moreover, in the heat pump mode, the on-off valve 241 of the expansion means 240 closes the flow channel 242 to serve an expansion function through the orifice 246, the three-way valve part 210 opens the outlet at the side of the exterior heat exchanger 130, and the on-off valve part 220 opens the bypass line R1. After that, when the second complex valve device 300 is closed, the refrigerant passing the on-off valve 241 of the expansion means 240 in the expanded state flows toward the exterior heat exchanger 130 through the three-way valve part 210, and the refrigerant passing the exterior heat exchanger 130 flows toward the bypass line R1 through the connection block 230.

The second complex valve device 300 is mounted on the refrigerant circulation line (R) at the inlet of the evaporator 160, and includes: an expansion valve part 310 having an expansion channel 312a to expand the refrigerant supplied to the evaporator 160; and an on-off valve part 320 for regulating the flow of the refrigerant passing the expansion channel 312a, and the expansion valve part 310 and the on-off valve part 320 are disposed integrally.

Furthermore, a notch part 312c is formed on the inner face of the expansion channel 312a for always flowing some of the refrigerant.

That is, the expansion valve part 310 having the expansion channel 312a and the notch part 312c and the on-off valve part 320 are mounted integrally in one complex valve device 300. Therefore, the heat pump system can carry out the expansion valve function, the on-off valve function and a function to always supply a fixed amount of refrigerant, thereby reducing the size of the heat pump system due to the simplification of the refrigerant circulation lines (pipes) (R), securing a space of the small engine room and enhancing workability and fuel efficiency by reducing weight because the plural components and functions are integrated by one complex valve device.

Furthermore, the expansion valve part 310 includes: a main body 311 which has the expansion channel 312a connected with the refrigerant circulation line (R) to expand the refrigerant therein and a communication channel 312b for flowing the refrigerant passing the expansion channel 312a; and opening and closing means 315 mounted on the main body 311 to open and close the expansion channel 312a.

Here, a flow channel 312 which is connected with the refrigerant circulation line (R) and in which the refrigerant flowing along the refrigerant circulation line (R) flows is formed inside the main body 311, and in this instance, the flow channel 312 includes: the expansion channel 312a which is formed in a section of the flow channel 312 inside the main body 311 and has a reduced diameter of the flow channel 312; and the communication channel 312b formed in a section of the downstream side of the expansion channel 312a.

Additionally, the opening and closing means 315 includes: a ball 316 arranged at one side (lower side) of the expansion channel 312a to operate to open and close the expansion channel 312a; and an operational shaft 317 formed inside the main body 311 to operate the ball 316.

Meanwhile, an elastic member 319 is mounted below the main body 311 to push the ball 316 toward the expansion channel 312a.

Moreover, a passing channel 313 is formed inside the main body 311 in such a way that the refrigerant discharged from the evaporator 160 passes before the refrigerant is introduced into the compressor 100.

Furthermore, a diaphragm 318 which is displaced according to a change in temperature of the refrigerant flowing inside the passing channel 313 is mounted on the upper part of the main body 311, and is connected with the operational shaft 317.

Therefore, the diaphragm 318 is displaced according to the change in temperature of the refrigerant which is discharged from the evaporator 160 and flows in the passing channel 313, and the operational shaft 317 operates the ball 316 to open and close the expansion channel 312a while going up and down according to a displacement amount.

Additionally, a notch part 312c is formed on the inner face of the expansion channel 312a, such that some of the refrigerant flows through the expansion channel 312a when the expansion channel 312a is in a closed state by the opening and closing means 315.

That is, the notch part 312c is formed on a seating surface of the expansion channel 312a on which the ball 316 is seated, such that a predetermined amount of refrigerant always passes the expansion channel 312a through the notch part 312c even though the ball 316 closes the expansion channel 312a.

In addition, the on-off valve part 320 of the second complex valve device 300 includes: an operating device 321 joined to one side of the main body 311; and an operating valve 322 which is mounted on the operating device 321 to carry out a reciprocating motion to open and close the communication channel 312b.

It is preferable that the operating device 321 be a solenoid to make the operating valve 322 carry out a rectilinearly reciprocating motion.

Therefore, when electricity is applied to the solenoid, the operating valve 322 closes the communication channel 312b of the main body 311 while moving. When electricity to the solenoid is blocked, the elastic member 323 mounted at the main body 311 moves the operating valve 322 to its initial position to open the communication channel 312b.

Figure 5:
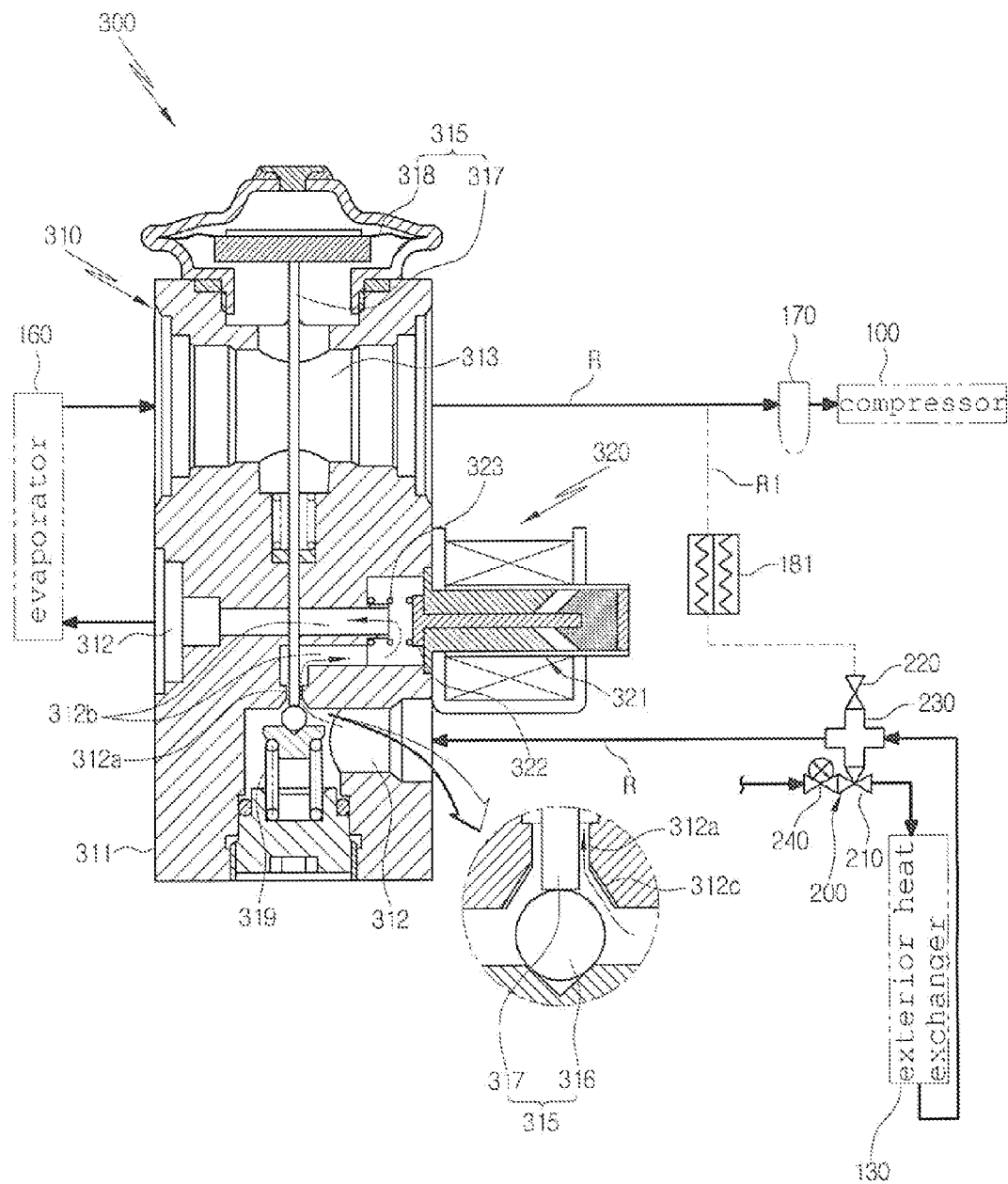
FIG. 5 is a sectional view showing an operational state of a second complex valve device of FIG. 2.

In such a second complex valve device 300, as shown in FIG. 5, in the air-conditioning mode, the expansion valve part 310 opens the expansion channel 312a and the on-off valve part 320 opens the communication channel 312b, such that the refrigerant discharged from the exterior heat exchanger 130 passes the connection block 230, and is expanded while passing the expansion channel 312a, and then, is supplied toward the evaporator 160 after passing the communication channel 312b.

Figure 8:
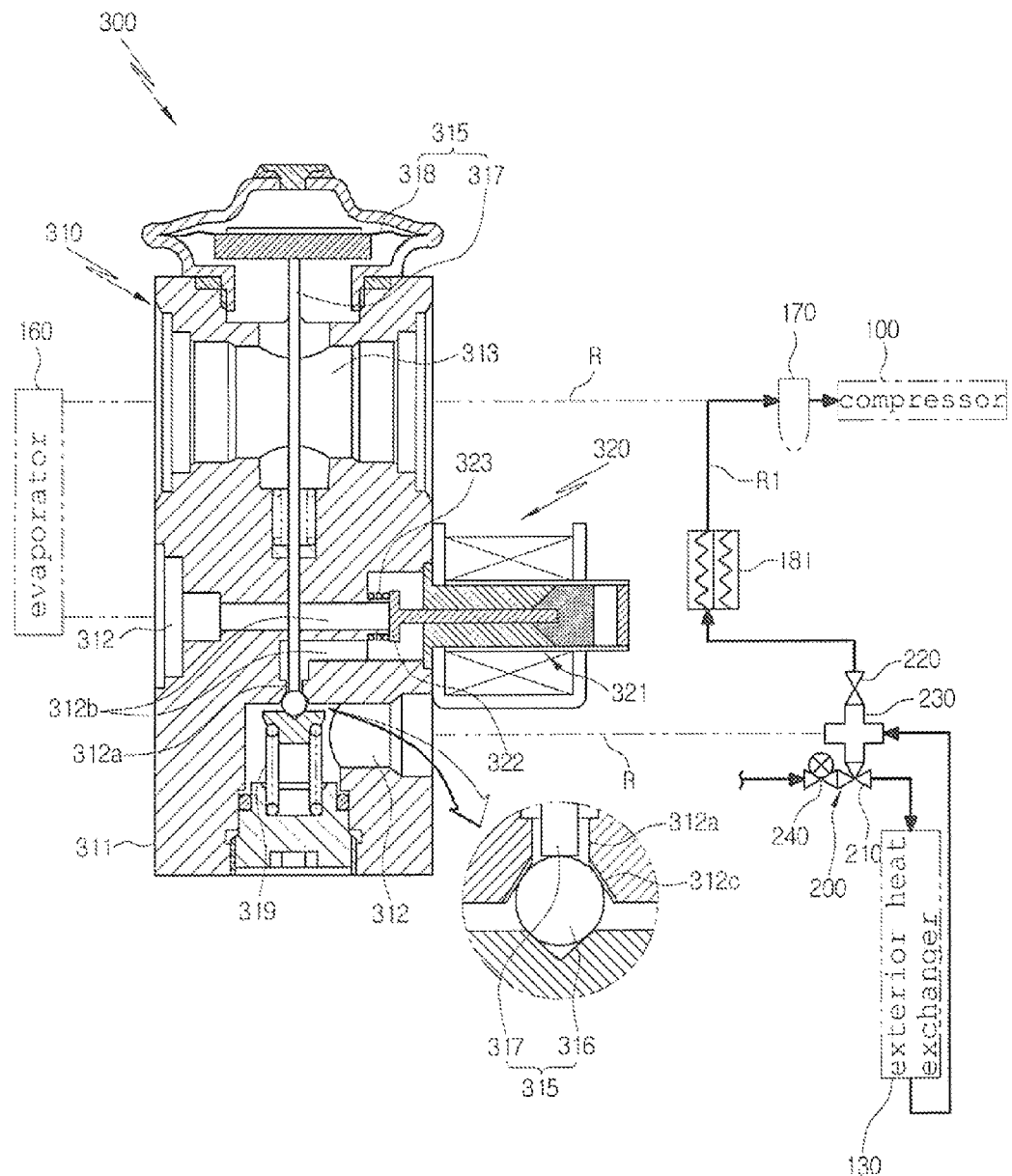
FIG. 8 is a sectional view showing an operational state of the second complex valve device of FIG. 6.

In the heat pump mode (maximum heating mode), as shown in FIG. 8, the expansion valve part 310 closes the expansion channel 312a and the on-off valve part 320 closes the communication channel 312b, such that the refrigerant discharged from the exterior heat exchanger 130 bypasses the second complex valve device 300 and the evaporator 160 while flowing toward the bypass line R1 through the connection block 230 and the on-off valve part 220.

In the meantime, in the dehumidification mode, the expansion valve part 310 closes the expansion channel 312a and the on-off valve part 320 opens the communication channel 312b, and in this instance, even though the ball 316 of the expansion valve part 310 closes the expansion channel 312a, refrigerant of the predetermined amount passes through the notch part 312c, such that, some of the refrigerant which is discharged from the exterior heat exchanger 130 and is induced into the connection block 230 flows toward the compressor 100 through the on-off valve part 220 and the bypass line R1, and some of the refrigerant passes the notch part 312c and the communication channel 312b along the refrigerant circulation line (R), is supplied toward the evaporator 160, and then, flows toward the compressor 100 to dehumidify the inside of the vehicle.

On the bypass line R1 which is mounted to bypass the second complex valve device 300 and the evaporator 160, a water cooling type heat exchanger 181 for heat-exchanging between the refrigerant flowing along the bypass line R1 and cooling water which circulates in an electronic unit 400 of the vehicle is mounted.

The water cooling type heat exchanger 181 includes: a refrigerant heat exchanging part 181a in which the refrigerant flowing the bypass line R1 flows to supply waste heat of the electronic unit 400 of the vehicle to the refrigerant; and a cooling water heat exchanging part 181b which is disposed at one side of the refrigerant heat exchanging part 181a to be able to exchange heat and in which cooling water circulating the electronic unit 400 of the vehicle flows.

Therefore, in the heat pump mode, the heat pump system can enhance heating performance by recovering the heat source from waste heat of the electronic unit 400 of the vehicle.

Meanwhile, the electronic unit 400 may be a motor, an inverter or others.

Moreover, an accumulator 170 is mounted on the refrigerant circulation line (R) of the inlet of the compressor 100.

The accumulator 170 divides the refrigerant supplied to the compressor 100 into a gas-phase refrigerant and a liquid-phase refrigerant, and then, make only the gas-phase refrigerant be supplied to the compressor 100.

Figure 15:
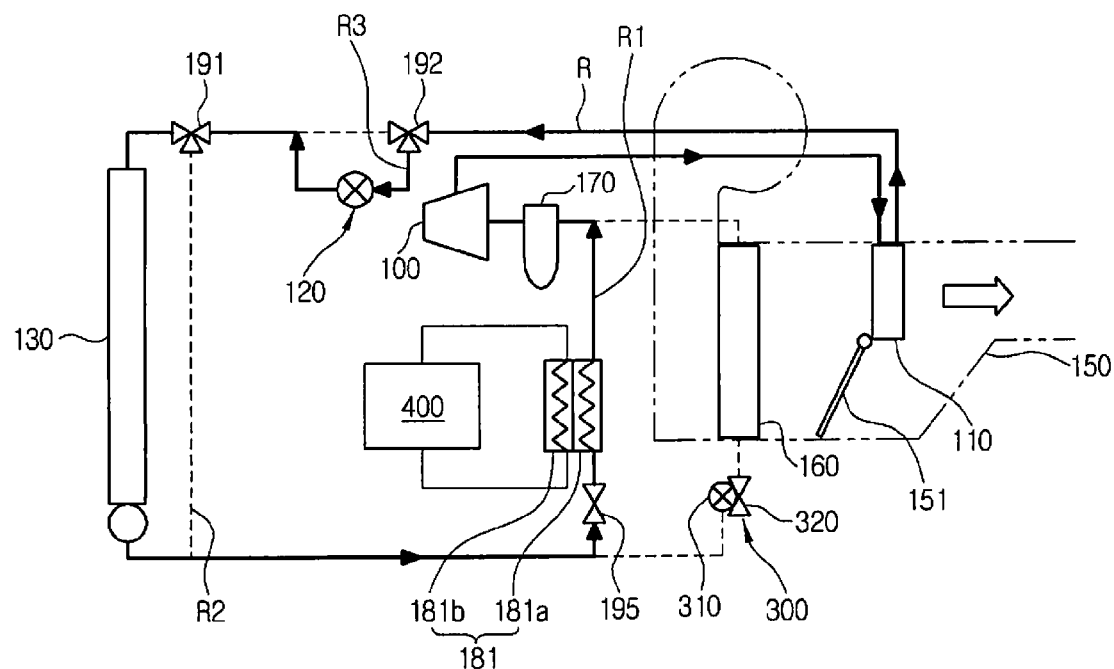
FIG. 15 is a configurative diagram showing a heat pump system for a vehicle according to another preferred embodiment of the present invention.

FIG. 15 illustrates a heat pump system for a vehicle according to another preferred embodiment of the present invention, and just parts different from parts of the previously described heat pump system will be described.

In FIG. 15, the second complex valve device 300 is used as it is, but the first complex valve device 200 is omitted. Therefore, the functions of the one first complex valve device 200 are carried out by various components, that is, expansion means 120, a first three-way valve 191a and a second three-way valve 192.

In other words, the functions of the first complex valve device 200 is divided to several components, but the refrigerant flow control is carried out in the same way. Of course, the number of the components of the heat pump system according to this embodiment is more than the number of the components of the case that the first complex valve device 200 is used, but the heat pump system can obtain the following effect just by the second complex valve device 300.

Additionally, in a case that the complex valve device is divided into several components, besides the bypass line R1 which bypasses the second complex valve device 300 and the evaporator 160, an auxiliary bypass line R2 which bypasses the exterior heat exchanger 130 is mounted, and an expansion line R3 is mounted on the refrigerant circulation line (R) for connecting the interior heat exchanger 110 and the exterior heat exchanger 130 is mounted in parallel.

Moreover, the first three-way valve 191 is mounted at a branch point of the auxiliary bypass line R2 and the second three-way valve 192 is mounted at a branch point of the expansion line R3.

In this instance, the three-way valve is not mounted at the branch point of the bypass line R1 but two on-off valves are mounted, wherein one on-off valve 195 of the on-off valves is mounted on the bypass line R1 and the other on-off valve 320 is integrated to the second complex valve device 300 mounted on the refrigerant circulation line (R) at the inlet of the evaporator 160.

That is, because the three-way valve has a demerit in that it is large and heavy, the tree-way vale is divided into two on-off valves. However, the heat pump system has another demerit in that the number of components is increased and connection of pipes is complicated when the two on-off valves are used.

Therefore, in order to solve such demerits, two on-off valves substitutes for the three-way valve mounted at the branch point of the bypass line R1 to serve the function of the three-way valve, and one of the on-off valves is integrated with the expansion valve 310 which is mounted at the inlet of the evaporator 160.

That is, the form that the on-off valve (on-off valve part) and the expansion valve (expansion valve part) mounted on the refrigerant circulation line (R) directing the evaporator 160 are integrated is the second complex valve device 300.

As described above, because the second complex valve device 300 is formed in such a way that the two on-off valves substitutes for the three-way valve mounted at the branch point of the bypass line R1 and one of the on-off valves is integrated with the expansion valve 310, the effects to reduce weight and the number of components and to simplify the structure of the pipes are applied equally also to the heat pump system illustrated in FIGS. 2 to 13.

Furthermore, the first three-way valve 191 mounted at the branch point of the bypass line R2 from the refrigerant circulation line (R) changes a flow direction of the refrigerant, so that refrigerant flows toward the exterior heat exchanger 130 or the auxiliary bypass line R2 according to whether or not defrosting is generated on the exterior heat exchanger 130.

That is, when defrosting is generated on the exterior heat exchanger 130, through control of the first three-way valve 191, the refrigerant is controlled to bypass the exterior heat exchanger 130 and flow toward the auxiliary bypass line R2.

As described above, even though the refrigerant bypasses the exterior heat exchanger 130, some of the refrigerant bypassing the exterior heat exchanger 130 recovers waste heat of the electronic unit 400 of the vehicle through the water cooling type heat exchanger 181, and some of the refrigerant is supplied to the evaporator 160 which exchanges heat with the indoor air through the second complex valve device 300 to recover the heat source of the indoor air, thereby enhancing heating performance.

Additionally, the expansion means 120 mounted on the expansion line R3 selectively expands the refrigerant supplied to the exterior heat exchanger 130 according to the air-conditioning mode or the heat pump mode.

It is preferable that the expansion means 120 use an orifice.

Therefore, in the air-conditioning mode, the refrigerant which is discharged from the compressor 100 and passes the interior heat exchanger 110 bypasses the expansion means 120 by the second three-way valve 192 and is supplied to the exterior heat exchanger 130.

In the heat pump mode (maximum heating mode), the refrigerant which is discharged from the compressor 100 and passes the interior heat exchanger 110 is expanded while passing the expansion means 120 by the second three-way valve 192 and is supplied to the exterior heat exchanger 130.

Meanwhile, FIG. 15 illustrates the maximum heating mode of the heat pump modes as an example, and various modes as shown in FIGS. 2 to 13 may be carried out.

Hereinafter, the action of the heat pump system for the vehicle according to the preferred embodiment of the present invention will be described.

A. Air-Conditioning Mode (Cooling Mode)

In the air-conditioning mode (cooling mode), as shown in FIGS. 2 to 5, the bypass line R1 is closed by the on-off valve 220, the expansion means 240 of the first complex valve device 200 opens the flow channel 242 and the three-way valve part 210 opens the outlet 212a of the exterior heat exchanger 130.

Furthermore, the expansion channel 312a and the communication channel 312b of the second complex valve device 300 are opened.

Meanwhile, in the maximum cooling, the temperature adjustable door 151 inside the air-conditioning case 150 closes the passage passing through the interior heat exchanger (condenser) 110, so that the air blown into the air-conditioning case 150 by the blower is cooled while passing through the evaporator 160 and is supplied to the interior of the vehicle by bypassing the interior heat exchanger 110 to thereby cool the interior of the vehicle.

Continuously, a refrigerant circulation process will be described.

The gas-phase refrigerant of high-temperature and high-pressure discharged after being compressed in the compressor 100 is supplied to the interior heat exchanger 110, which serves as a condenser, mounted inside the air-conditioning case 150.

As shown in FIG. 2, the refrigerant supplied to the interior heat exchanger 110 directly passes the expansion means 240 and the three-way valve part 210 of the first complex valve device 200 and flows to the exterior heat exchanger 130 (condenser) without heat-exchanging with the air because the temperature adjustable door 151 closes the passage of the interior heat exchanger 110.

The refrigerant flowing to the exterior heat exchanger 130 is condensed while heat-exchanging with the outdoor air, and thereby, the gas-phase refrigerant is converted into the liquid-phase refrigerant.

In the meantime, all of the interior heat exchanger 110 and the exterior heat exchanger 130 serve as the condensers, but the refrigerant is mainly condensed in the exterior heat exchanger 130 which heat-exchanges with the outdoor air.

Continuously, the refrigerant passing through the exterior heat exchanger 130 is decompressed and expanded while passing through the expansion channel 312a of the second complex valve device 300 via the connection block 230 to thereby become a liquid-phase refrigerant of low-temperature and low-pressure, and then, is introduced into the evaporator 160 after passing through the communication channel 312b opened by the on-off valve part 320.

The refrigerant introduced into the evaporator 160 is evaporated by heat-exchanging with the air blown into the air-conditioning case 150 by the blower, and at the same time, cools the air due to a heat absorption by an evaporative latent heat of the refrigerant, and then, the cooled air is supplied to the interior of the vehicle to cool the interior.

After that, the refrigerant discharged from the evaporator 160 is introduced into the compressor 100 and recirculates the above cycle.

B. Maximum Heating Mode of Heat Pump Mode

Figure 7:
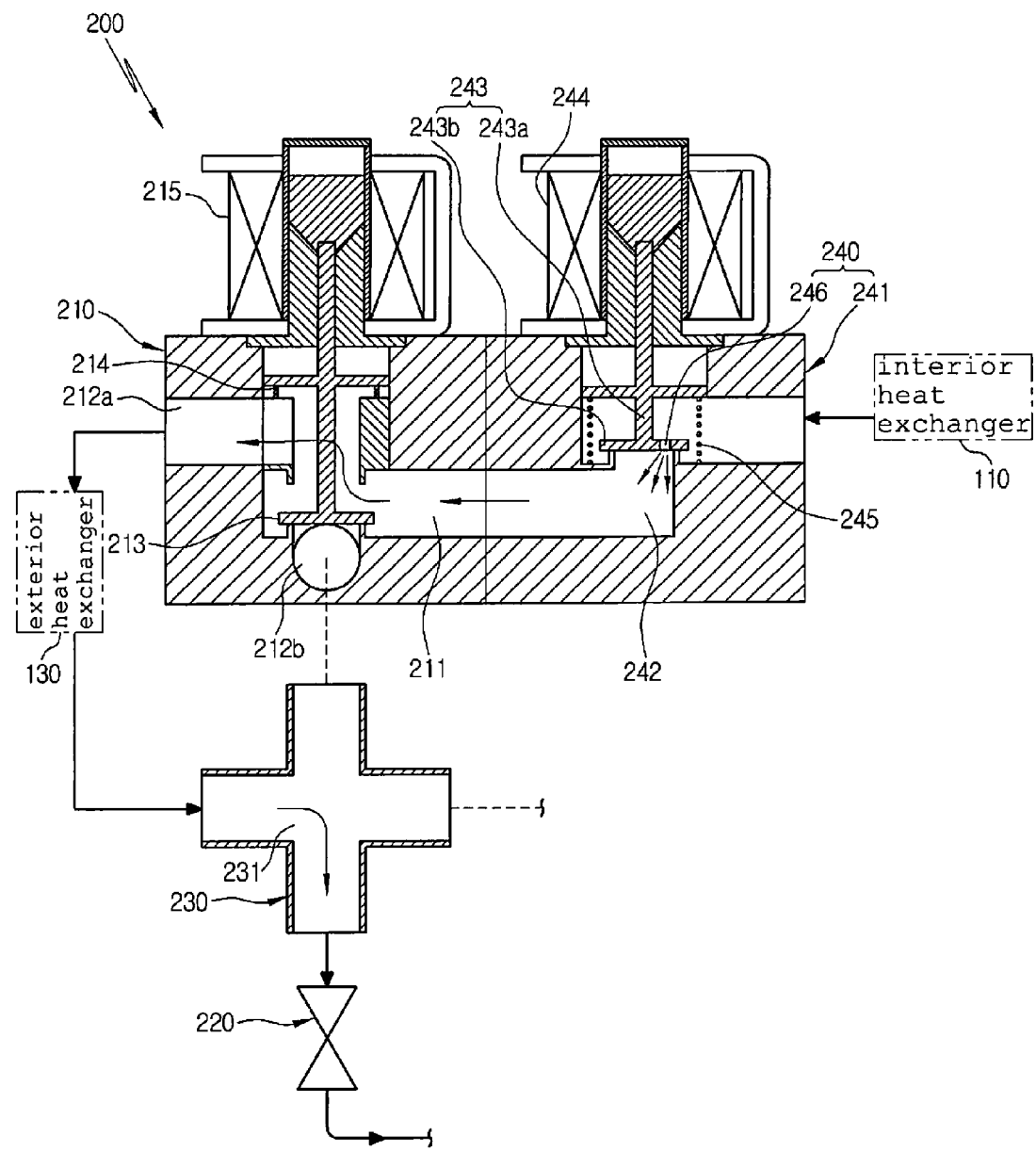
FIG. 7 is a sectional view showing operational states of the three way valve part and the expansion means of FIG. 6.

As shown in FIGS. 6 to 8, in the maximum heating mode of the heat pump mode, the bypass line R1 is opened through the on-off valve part 220, the expansion means 240 of the first complex valve device 200 closes the flow channel 242 to carry out the expansion function through the orifice 246, and the three-way valve part 210 opens the outlet 212a at the side of the exterior heat exchanger 130.

Moreover, the expansion channel 312a and the communication channel 312b of the second complex valve device 300 are closed, such that the refrigerant flowing to the connection block 230 does not flow toward the second complex valve device 300 and the evaporator 160.

Furthermore, in the heating mode, the temperature adjustable door 151 inside the air-conditioning case 150 closes the passage bypassing the interior heat exchanger 110 which serves as a condenser, so that the air blown into the air-conditioning case 150 by the blower is changed into warm air while passing through the interior heat exchanger 110 after passing through the evaporator 160 which is stopped in operation, and then is supplied to the interior of the vehicle to heat the interior of the vehicle.

Continuously, a refrigerant circulation process will be described.

The gas-phase refrigerant of high-temperature and high-pressure discharged after being compressed in the compressor 100 is introduced into the interior heat exchanger 110, which serves as a condenser, mounted inside the air-conditioning case 150.

The gas-phase refrigerant of high-temperature and high-pressure introduced into the interior heat exchanger 110 is condensed while heat-exchanging with the air blown into the air-conditioning case 150 by the blower, and in this instance, the air passing through the interior heat exchanger 110 is converted into warm air and supplied to the interior of the vehicle to thereby heat the interior of the vehicle.

Continuously the refrigerant discharged from the interior heat exchanger 110 is decompressed and expanded while passing through the orifice 246 inside the expansion means 240 of the first complex valve device 200 to become a liquid-phase refrigerant of low-temperature and low-pressure, and then, is supplied to the exterior heat exchanger 130, which serves as an evaporator, through the three-way valve part 210.

The refrigerant supplied to the exterior heat exchanger 130 is evaporated while heat-exchanging with the indoor air and flows toward the bypass line R1 through the connection block 230 and the on-off valve part 220. In this instance, the refrigerant passing the bypass line (R1) heat-exchanges with the cooling water passing through the cooling water heat-exchanging part 181b while passing through the refrigerant heat-exchanging part 181a of the water cooling type heat exchanger 181 so as to recover the waste heat of the electronic units 400 of the vehicle, and then, is introduced into the compressor 100 to recirculate the above cycle.

C. Dehumidification Mode of Heat Pump Mode

Figure 9:
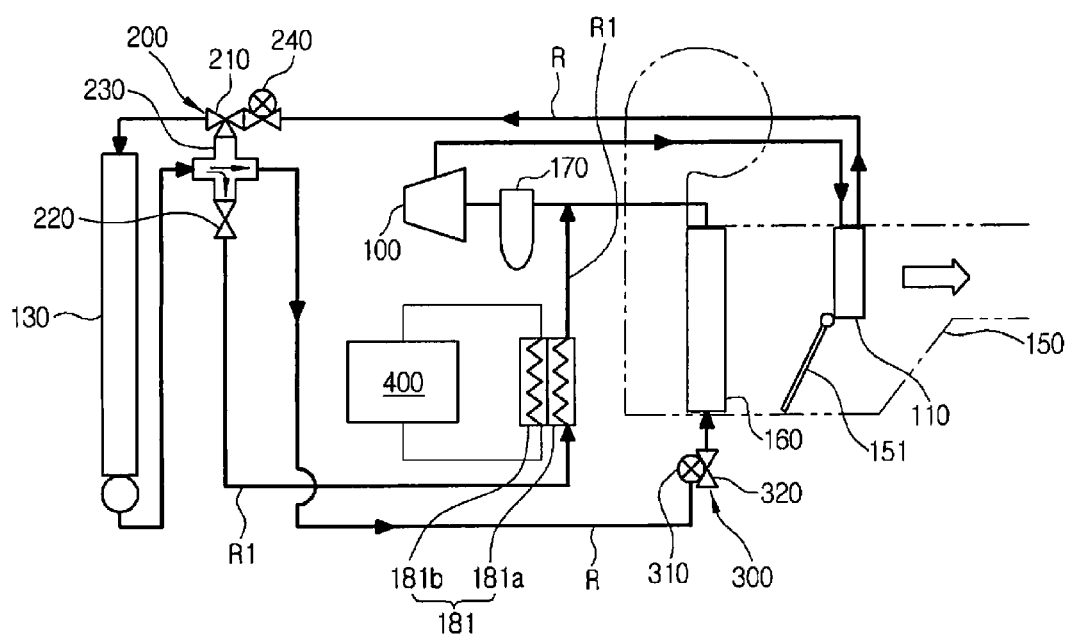
FIG. 9 is a configurative diagram showing a dehumidification mode of heat pump modes of the heat pump system for the vehicle according to the preferred embodiment of the present invention.
Figure 10:
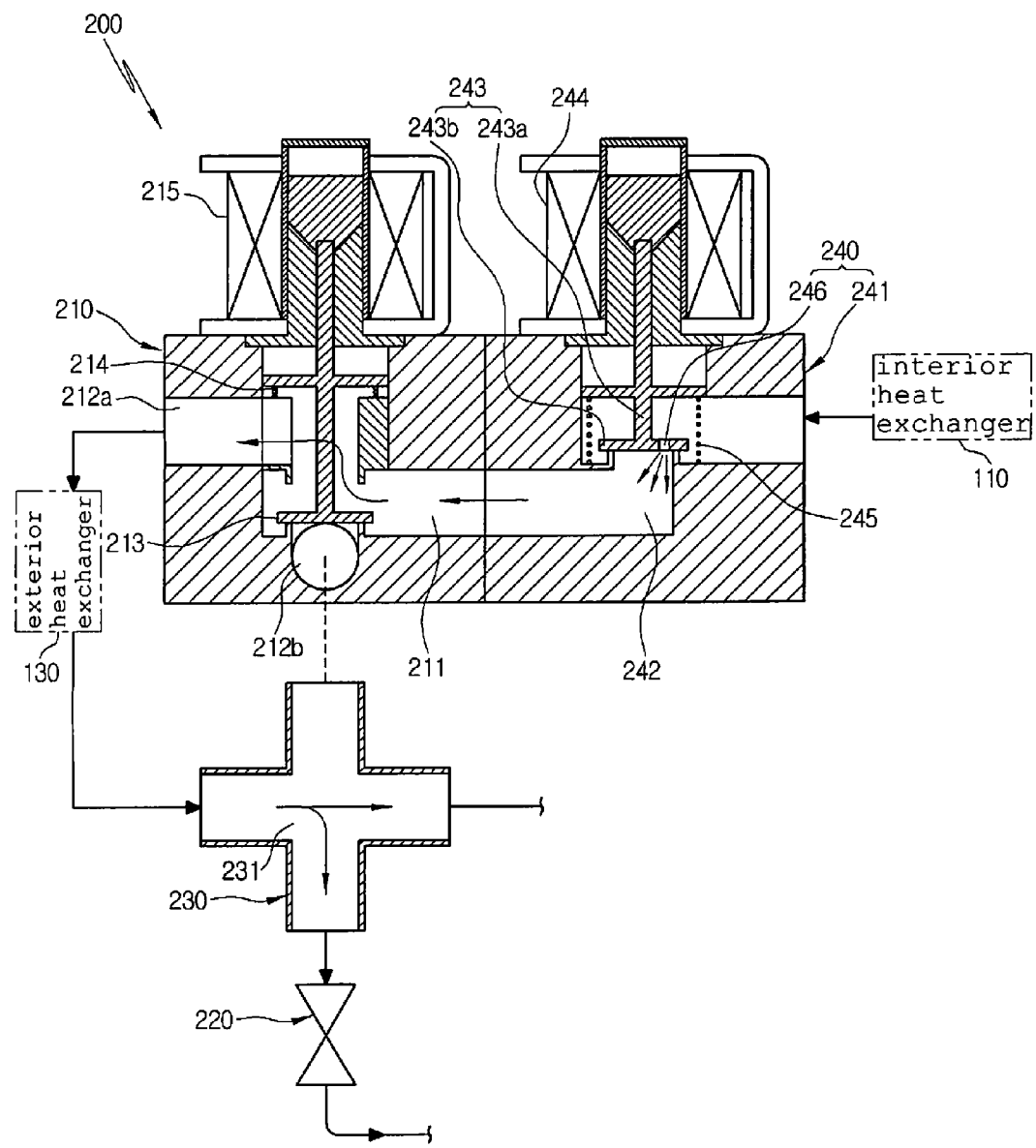
FIG. 10 is a sectional view showing operational states of the three way valve part and the expansion means of FIG. 9.
Figure 11:
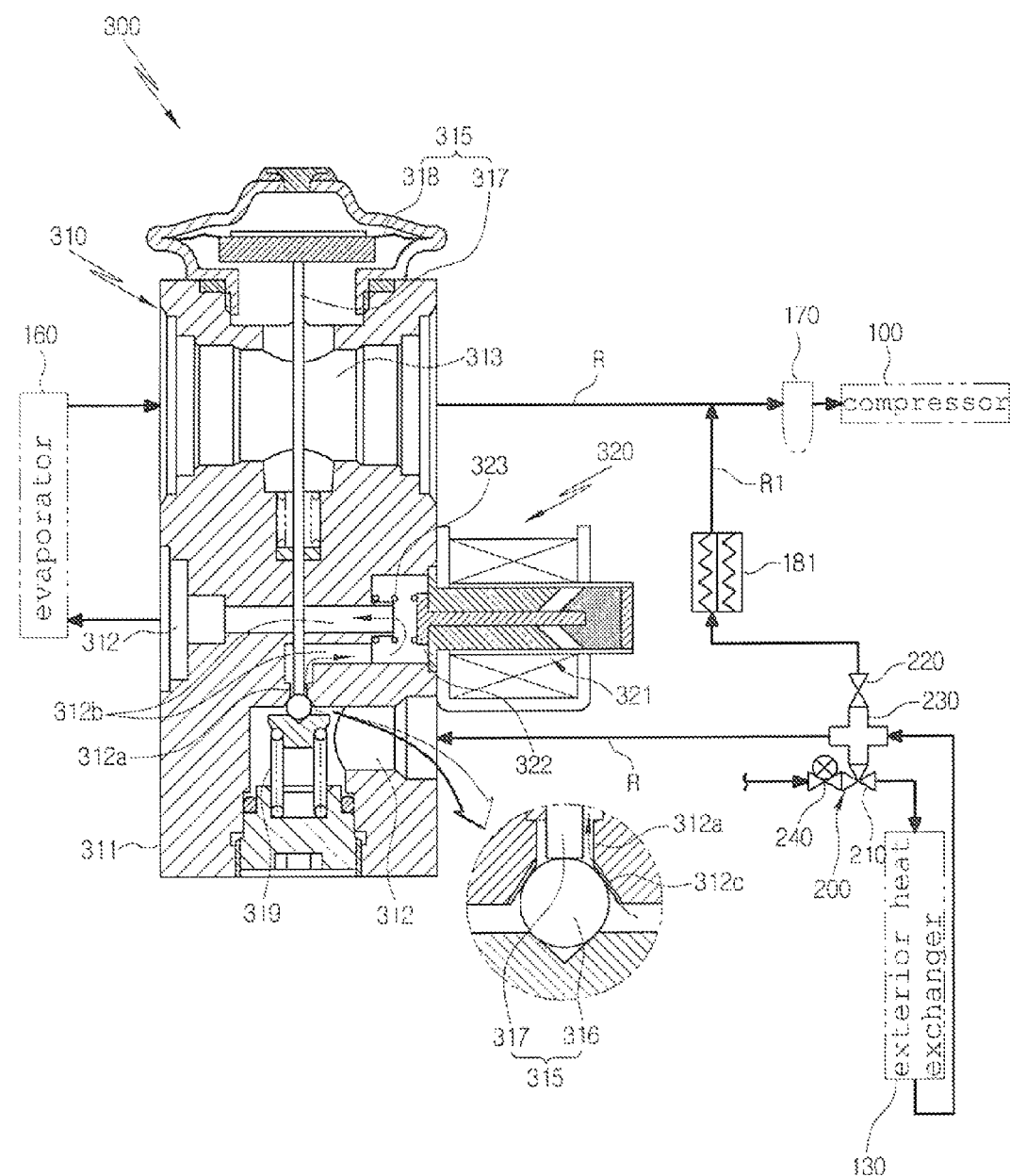
FIG. 11 is a sectional view showing an operational state of the second complex valve device of FIG. 9.

As shown in FIGS. 9 to 11, the dehumidification mode of the heat pump mode is operated only in a case that dehumidification of the interior of the vehicle is needed while the system is operated in the maximum heating mode of FIG. 6.

Therefore, only different parts from the first heating mode of FIG. 6 will be described.

In the dehumidification mode, the expansion channel 312a of the second complex valve device 300 is closed and the communication channel 312b is opened in the maximum heating mode state.

In this instance, even though the ball 316 of the expansion valve part 310 gets in contact with the expansion channel 312a to close the expansion channel 312a, the predetermined amount of the refrigerant can always pass the expansion channel 312a through the notch part 312c formed on the inner face of the expansion channel 312a.

Therefore, the refrigerant introduced into the connection block 230 of the first complex valve device 200 is divided into two parts so that some of the refrigerant flows toward the second complex valve device 300 and the evaporator 160 and some of the refrigerant flows toward the bypass line R1.

Moreover, the temperature-adjusting door 151 inside the air-conditioning case 150 is operated to close a passage bypassing the interior heat exchanger 110 which serves as a condenser. Therefore, air blown into the air-conditioning case 150 by a blower is cooled and dehumidified while passing the evaporator 160, and then, is changed into warm air while passing the interior heat exchanger 110 and is supplied to the interior of the vehicle, such that the heat pump system can heat the interior of the vehicle.

In this instance, because the amount of the refrigerant supplied to the evaporator 160 is small and an air cooling performance is low, it minimizes a change of indoor temperature, such that the heat pump system can smoothly dehumidify the air passing the evaporator 160.

Continuously, a refrigerant circulation process will be described.

The refrigerant passing the compressor 100, the interior heat exchanger 110, the orifice 246 inside the expansion means 240 of the first complex valve device 200, the three-way valve part 210 and the exterior heat exchanger 130 is introduced into the connection block 230. Some of the refrigerant introduced into the connection block 230 exchanges heat with cooling water passing the cooling water heat exchanging part 181b while passing the refrigerant heat exchanging part 181a of the water cooling type heat exchanger 181 of the bypass line R1 to be evaporated while recovering the waste heat of the electronic unit 400 of the vehicle, and some of the refrigerant is supplied to the evaporator 160 through the communication channel 312b after passing the notch part 312c of the expansion channel 312a of the second complex valve device 300 so as to be evaporated while heat-exchanging with the air flowing inside the air-conditioning case 150.

In the above process, the air passing the evaporator 160 is dehumidified, and the dehumidified air is changed into warm air while passing the interior heat exchanger 110 which serves as a condenser, and then, is supplied to the interior of the vehicle so as to carry out dehumidification.

After that, the refrigerants respectively passing the water-cooling type heat exchanger 181 and the evaporator 160 meet together and are introduced into the compressor 100, and then, the above-mentioned cycle is re-circulated.

D. Defrosting Mode of Heat Pump Mode

Figure 12:
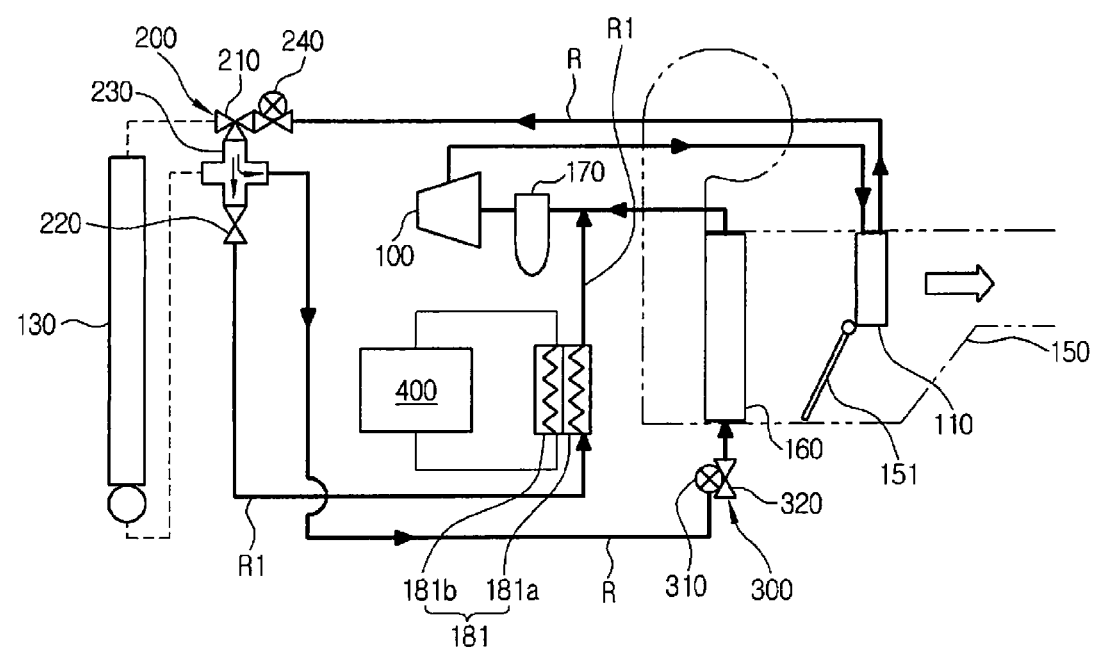
FIG. 12 is a configurative diagram showing a defrost mode of heat pump modes of the heat pump system for the vehicle according to the preferred embodiment of the present invention.
Figure 13:
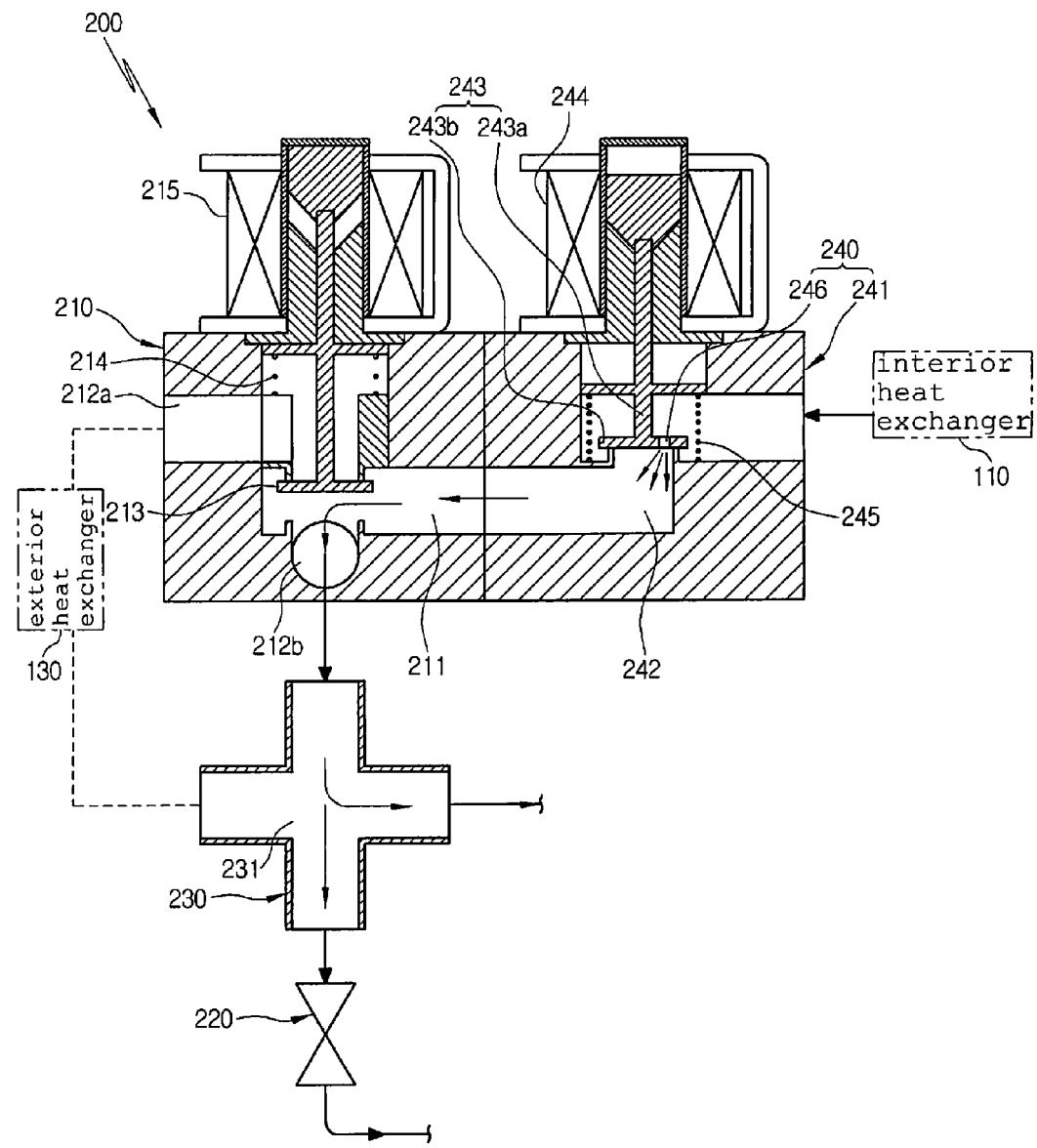
FIG. 13 is a sectional view showing operational states of the three way valve part and the expansion means of FIG. 12.

As shown in FIGS. 12 and 13, the defrosting mode of the heat pump mode is operated only in a case that defrosting is needed because of frosting generated on the exterior heat exchanger 130.

In the defrosting mode, in a case that defrosting of the exterior heat exchanger 130 during the maximum heating mode of FIG. 6 is needed, the refrigerant bypasses the exterior heat exchanger 130 to defrost. Of course, the mode may be converted into an air-conditioning mode to carry out defrosting.

Additionally, in the dehumidification mode, as shown in FIG. 13, the expansion means 240 of the first complex valve device 200 closes the flow channel 242 to carry out the expansion function through the orifice 246, and the three-way valve part 210 opens the outlet 212b at the side of the connection block 230 so that the refrigerant bypasses the exterior heat exchanger 130.

In the meantime, as shown in FIG. 11, in the second complex valve device 300, because the expansion channel 312a is closed and the communication channel 312b is opened, the refrigerant of the predetermined amount can flow toward the expansion channel 312a and the communication channel 312b through the notch part 312c of the expansion channel 312a.

Moreover, in the defrosting mode, the temperature-adjusting door 151 inside the air-conditioning case 150 is operated to close a passage bypassing the interior heat exchanger 110 which serves as a condenser. Therefore, air blown into the air-conditioning case 150 by a blower is cooled while passing the evaporator 160, and then, is changed into warm air while passing the interior heat exchanger 110 and is supplied to the interior of the vehicle, such that the heat pump system can heat the interior of the vehicle.

Continuously, a refrigerant circulation process will be described.

The gas-phase refrigerant of high-temperature and high-pressure discharged after being compressed in the compressor 100 is supplied to the interior heat exchanger 110 mounted inside the air-conditioning case 150.

The gas-phase refrigerant of high-temperature and high-pressure introduced into the interior heat exchanger 110 is condensed while exchanging heat with the air blown to the inside of the air-conditioning case 150 through the blower, and in this instance, the air passing the interior heat exchanger 110 is converted into warm air, and then, is supplied to the inside of the vehicle to heat the inside of the vehicle.

Continuously, the refrigerant discharged from the interior heat exchanger 110 is decompressed and expanded while passing through the orifice 246 inside the expansion means 240 of the first complex valve device 200 to become a liquid-phase refrigerant of low-temperature and low-pressure, and then, flows toward the connection block 230 through the three-way valve part 210 and bypasses the exterior heat exchanger 130.

Some of the refrigerant introduced into the connection block 230 exchanges heat with cooling water passing the cooling water heat exchanging part 181b while passing the refrigerant heat exchanging part 181a of the water cooling type heat exchanger 181 of the bypass line R1 so as to be evaporated while recovering the waste heat of the electronic unit 400 of the vehicle, and some of the refrigerant is supplied to the evaporator 160 through the communication channel 312b after passing the notch part 312c of the expansion channel 312a of the second complex valve device 300 so as to be evaporated while heat-exchanging with the air flowing inside the air-conditioning case 150.

After that, the refrigerants respectively passing the water-cooling type heat exchanger 181 and the evaporator 160 meet together and are introduced into the compressor 100, and then, the above-mentioned cycle is re-circulated.

What is claimed is:

1. A heat pump system for a vehicle in which an interior heat exchanger and an evaporator mounted inside an air-conditioning case and a compressor and an exterior heat exchanger mounted outside the air-conditioning case are connected to a refrigerant circulation line and in which refrigerant circulates the compressor, the interior heat exchanger, the exterior heat exchanger and the evaporator in order, wherein the heat pump system comprises:

a bypass line which is mounted in a specific zone of the refrigerant circulation line, such that the refrigerant circulating along the refrigerant circulation line selectively bypasses the evaporator; and a first complex valve device including a three-way valve, an on-off valve and connection blocks, wherein the three-way valve, on-off valve, and connection blocks are formed integrally with one another, wherein the three-way valve is connected to the refrigerant circulation line of an inlet of the exterior heat exchanger such that the refrigerant selectively bypasses the exterior heat exchanger, the on-off valve is connected to an inlet of the bypass line to open and close the bypass line, and the connection blocks connect the three-way valve and the on-off valve with the refrigerant circulation line of an outlet of the exterior heat exchanger to communicate with each other.

2. The heat pump system according to claim 1, wherein the first complex valve device includes an expansion means, wherein the expansion means is connected to an inlet of the three-way valve to selectively expand refrigerant discharged from the interior heat exchanger.

3. The heat pump system according to claim 2, wherein the expansion means further includes:
   a second on-off valve is mounted to connect the refrigerant circulation lines of the inlet of the three-way valve and an outlet of the interior heat exchanger to regulate a flow of the refrigerant; and
   an orifice disposed integrally with the second on-off valve to expand the refrigerant,
   wherein the expansion means makes the refrigerant flow in an unexpanded state when the second on-off valve is opened but makes the refrigerant flow in an expanded state through the orifice when the second on-off valve is closed.

4. The heat pump system according to claim 3, wherein the second on-off valve further includes:
   a flow channel formed to make the refrigerant flow inside the second on-off valve; and
   a valve member mounted to open and close the flow channel,
   wherein the orifice is formed on the valve member.

5. The heat pump system according to claim 4, wherein the valve member includes:
   a shaft connected with an operating device mounted at one side of the second on-off valve; and
   a valve plate formed on the shaft to open and close the flow channel,
   wherein the orifice is formed through the valve plate of the valve member.

6. The heat pump system according to claim 4, wherein the valve member further includes:
   a hollow shaft connected with an operating device mounted at one side of the second on-off valve; and
   a valve plate formed on the shaft to open and close the flow channel,
   wherein the orifice is formed through the inside and outside of the hollow shaft of the valve member.

7. The heat pump system according to claim 2, wherein the three-way valve includes:
   one inlet connected with the expansion means;
   two outlets which are branched from the inlet and respectively connected with the refrigerant circulation line of the inlet of the exterior heat exchanger and the connection block; and
   a valve for selectively opening and closing the two outlets.

8. The heat pump system according to claim 1, wherein the connection blocks include a four-way flow channel formed to communicatably connect the three-way valve, the on-off valve and the refrigerant circulation line of the outlet of the exterior heat exchanger.

9. The heat pump system according to claim 1, further comprising:
   a second complex valve device which is mounted on the refrigerant circulation line of the inlet of the evaporator, wherein the second complex valve includes:
      an expansion valve having an expansion channel for expanding the refrigerant supplied to the evaporator; and
      a third on-off valve for regulating a flow of the refrigerant passing the expansion channel,
      wherein the expansion valve and the third on-off valve are formed integrally with each other.

10. The heat pump system according to claim 9, wherein the expansion valve further includes:
    a main body connected with the refrigerant circulation line, wherein the main body has the expansion channel for expanding the refrigerant;
    a communication channel in which the refrigerant passing the expansion channel flows; and
    an opening and closing means mounted on the main body to open and close the expansion channel.

11. The heat pump system according to claim 10, wherein the expansion valve further includes a notch formed on the inner face of the expansion channel, such that some of the refrigerant flows through the expansion channel even though the expansion channel is closed by the opening and closing means.

12. The heat pump system according to claim 10, wherein the opening and closing means includes:
    a ball arranged at one side of the expansion channel to open and close the expansion channel; and
    an operating shaft elevatably mounted inside the main body to operate the ball.

13. The heat pump system according to claim 10, wherein the third on-off valve includes:
    an operating device joined to one side of the main body; and
    an operating valve reciprocatably mounted on the operating device to open and close the communication channel.

14. The heat pump system according to claim 13, wherein the operating device is a solenoid which makes the operating valve carry out a rectilinearly reciprocating motion.

15. The heat pump system according to claim 1, wherein a water cooling type heat exchanger is mounted on the bypass line and includes: a refrigerant heat exchanging part in which the refrigerant flowing the bypass line flows to supply waste heat of an electronic unit of the vehicle to the refrigerant; and a cooling water heat exchanging part which is disposed at one side of the refrigerant heat exchanging part to exchange heat and in which cooling water circulating the electronic unit of the vehicle flows.

* * * * *